United States Patent

[11] 3,621,379

| [72] | Inventors | Edward Watson<br>South Hayling;<br>Dennis M. Wilkins, Purley; Ronald L. Johnson, New Malden, all of England |
|---|---|---|
| [21] | Appl. No. | 822,605 |
| [22] | Filed | May 7, 1969 |
| [45] | Patented | Nov. 16, 1971 |
| [73] | Assignee | Coal Industry (Patents) Limited<br>London, England |
| [32] | Priority | May 8, 1968 |
| [33] | | Great Britain |
| [31] | | 21,802/68 |

[54] INTERMITTENTLY MOVING CONVEYOR APPARATUS FOR DETERMINING THE MOISTURE CONTENT OF SUBSTANCES THEREON
5 Claims, 5 Drawing Figs.

[52] U.S. Cl. .................................................. 324/0.5 R
[51] Int. Cl. ............................................... G01n 27/78
[50] Field of Search ........................................ 324/0.5, 61, 58, 58.5, 73, 65; 250/83.3 D

[56] References Cited
UNITED STATES PATENTS

| 2,728,890 | 12/1955 | Zimmerman | 324/73 |
| 2,999,381 | 9/1961 | Chope | 324/0.5 |
| 3,009,109 | 11/1961 | Jankowski | 324/73 |
| 3,394,300 | 7/1968 | Packard | 324/0.5 |

Primary Examiner—Michael J. Lynch
Attorney—Stevens, Davis, Miller & Mosher

ABSTRACT: An apparatus is disclosed in which the moisture content of a substance, whether in the form of a divided solid or a compact body, can be determined. A nuclear resonance spectrometer is used to determine the moisture content and a drive mechanism feeds a conveyor carrying the substance through the spectrometer intermittently. The conveyor is made of a water nonabsorbing material having a low hydrogen content. The conveyor is subject to a scraping and drying action after the discharge of substance from the conveyor.

INTERMITTENTLY MOVING CONVEYOR APPARATUS FOR DETERMINING THE MOISTURE CONTENT OF SUBSTANCES THEREON

This invention relates to apparatus for determining the moisture content of solid substance.

The invention is particularly concerned with apparatus which incorporates a nuclear magnetic resonance spectrometer (hereinafter referred to as a N.M.R. spectrometer) for determining the moisture content of the substance which may for example be divided coal, briquettes, cement, food or powered detergent.

It is desirable that the apparatus should be operated continuously especially when it is required to monitor the moisture content of a flow of substance. HOwever the N.M.R. spectrometer operates most simply and effectively on a material sample which is held stationary relative to the spectrometer for a short period during operation of the spectrometer.

It is an object of the invention to provide apparatus for continuously determining the moisture content of a flow of a substance by means of a N.M.R. spectrometer.

According to the invention apparatus for determining the moisture content of material comprises a nuclear magnetic resonance spectrometer, a flexible conveyor made of a material having a negligible hydrogen content, a guide for the conveyor in the area of a sensing element of the spectrometer, and a drive for the conveyor, the drive including means for advancing the conveyor intermittently so that the conveyor is held stationary relative to the spectrometer for a predetermined period.

Further features of the invention appear from the following description of an embodiment of the invention given by way of example and with reference to the accompanying drawings in which.

Figure 1:
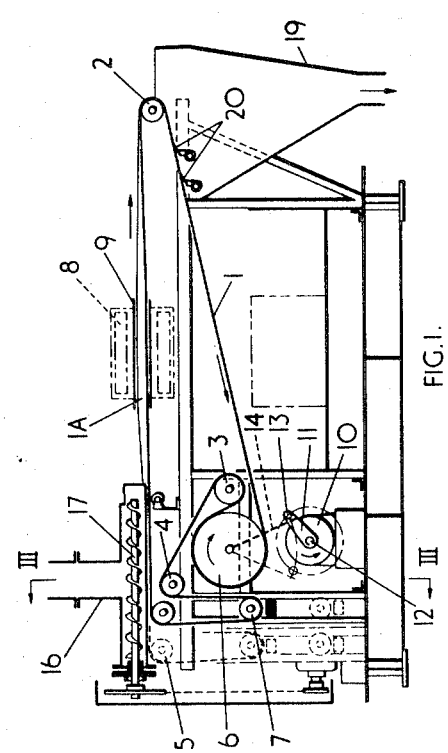
FIG. 1 is a side sectional elevation of the apparatus.
Figure 2:
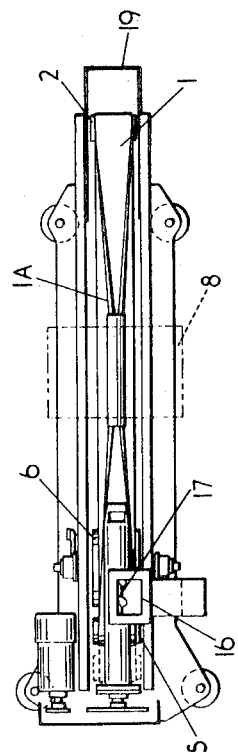
FIG. 2 is a plan view.
Figure 3:
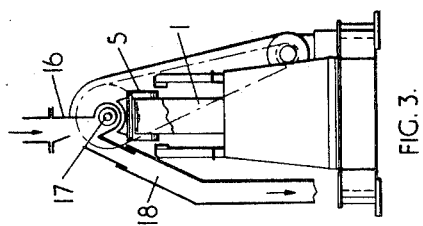
FIG. 3 is a sectional end elevation on the line III—III in FIG. 1.

Referring to FIGS. 1–3 apparatus for determining the moisture content of particulate solid substance, and of particular application to the determination of the moisture content of coal slack, comprises a conveyor belt 1 trained around a discharge roller 2, guide rollers 3, 4 and 5 a drive roller 6 and a tensioning roller 7. The conveyor belt 1 is made of a material having a negligible hydrogen content but which is flexible, of high tensile strength and which absorbs a negligible amount of water, and has good resistance to abrasion. A suitable material is synthetic fiber fabric such as that sold under the name 'Terylene' coated with polyurethane to reduce the water-absorbing properties of the fabric.

The sensing element of a N.M.R. spectrometer 8 is located around the conveying run of the conveyor belt 1 and the spectrometer 8 has a tubular bore 9 extending longitudinally and horizontally through the casing of the spectrometer. It is envisaged that the bore 9 may alternatively be inclined or vertical with necessary modifications to the rest of the apparatus being made. The conveyor belt 1 passes through the bore 9 and is guided to form a tube-shaped portion 1A as it passes through the bore 9 so as to enclose material being carried by the belt and prevent moisture in the material contacting the bore. The N.M.R. spectrometer consists fundamentally of a powerful magnet acting as a sensing element, a radiofrequency oscillator and a radiofrequency detector and detects, in known manner, the abundance of hydrogen nuclei in the bore 9 which is subjected to a magnetic filed produced by the magnet. The spectrometer detects the number of hydrogen nuclei present in the water associated with the substance whose moisture content is to be determined and the number of hydrogen nuclei present in the solid substance. However it is possible to differentiate between the hydrogen nuclei detected in the water and in the solid substance and therefore it is possible to determine the amount of water associated with the solid substance in relation to the mass of substance located within the magnetic field. It has been found that if the substance located in said magnetic field is moving, the number of hydrogen nuclei detected is affected and an inaccurate determination is given.

The conveyor belt 1 is driven incrementally by the driving roller 6 in order to meet the above-mentioned requirement of the N.M.R. spectrometer. A drive motor 10 has a drive arm 11 attached to the motor drive shaft 12 and the arm 11 carries at its outer end a cam member 13. The drive roller 6 has an arm 14 movable about the roller axis and located on the roller 6 by a "free wheel" device 15 (see FIG. 4) by which the arm 14 and roller 6 can rotate together in a clockwise direction as shown in FIG. 1 and the arm 14 can return under its own weight to its initial position independently of the roller 6 after the cam member 13 loses contact with the arm 14. Thus rotation of the drive motor 10 and arm 11 causes the cam member 13 to engage the arm 14 of the roller 6 rotate the roller 6 through an arc and move the conveyor belt forward. The member 13 then disengages from the arm 14 and the arm 14 returns to its initial position under the action of a balance arm 29 (see FIG. 4) to be engaged by the cam 13 on a further revolution of the arm 11.

In this way the drive roller 6 rotates in increments with a time interval between the stopping and starting of each movement of the roller 6. During the time interval the N.M.R. spectrometer 8 effects a determination of the moisture content of the substance present on the belt-portion 1A in the bore 9 of the spectrometer. The drive means of the conveyor belt 1 is arranged so that the belt is moved forward in predetermined increments such that the whole of the material on the belt 1 has a moisture determination made on it in separate increments.

Substance is fed onto the belt 1 in a controlled manner by feed means which, as shown in FIGS. 1–3 is suitable for solid divided substance, for example coal slack. The feed means includes a chute 16 and a screw feeder 17. The substance passes down the chute 16 into the screw feeder 17, any excess substance which cannot be accommodated in the screw feeder 17 being discharged along an overspill chute 18. The screw feeder 17 discharges the substance onto the conveyor belt 1 and after the moisture determination by the spectrometer 8 the substance is discharged from the belt at the discharge roller 2 into a discharge chute 19. Belt cleaners 20 scrape off any substance adhering to the belt and such substance also passes into the chute 19.

Preferably the discharge chute 19 is mounted on a weigh beam (not shown) so that the weight of substance in the chute can be determined. The chute 19 also has a bottom closure plate (not shown) to prevent substance leaving the chute until a predetermined weight is shown by the weigh beam to be present in the chute. Upon the predetermined weight of substance being registered by the weigh beam the substance is discharged from the chute by opening the bottom closure plate. While this discharge is taking place movement of the conveyor belt is prohibited by an interlocking switching arrangement (not shown).

The above arrangement affords a simple system for obtaining the moisture content of the substance independent of the weight of material per unit length of belt, the speed of the belt or other irregular movement of the belt. The N.M.R. spectrometer provides a cumulative measurement of the moisture content of the substance between each discharge of the discharge chute, and, since the weight of substance passing the spectrometer is known, the proportion of moisture in each batch of substance can be found directly from the two measurements, other variables being cancelled out since they are the same for each measurement. Consequently complex computing systems are not required. To eliminate as far as possible any cause of error the rate of feed to the belt is arranged so that when the belt is formed into a tube substantially the whole of the tube is filled with the substance, in practical terms about 95 percent.

In order to prevent residual moisture remaining on the conveyor after discharge of the substance a hot air-drier (not shown) may be provided, directed onto the return run of belt.

Figure 4:
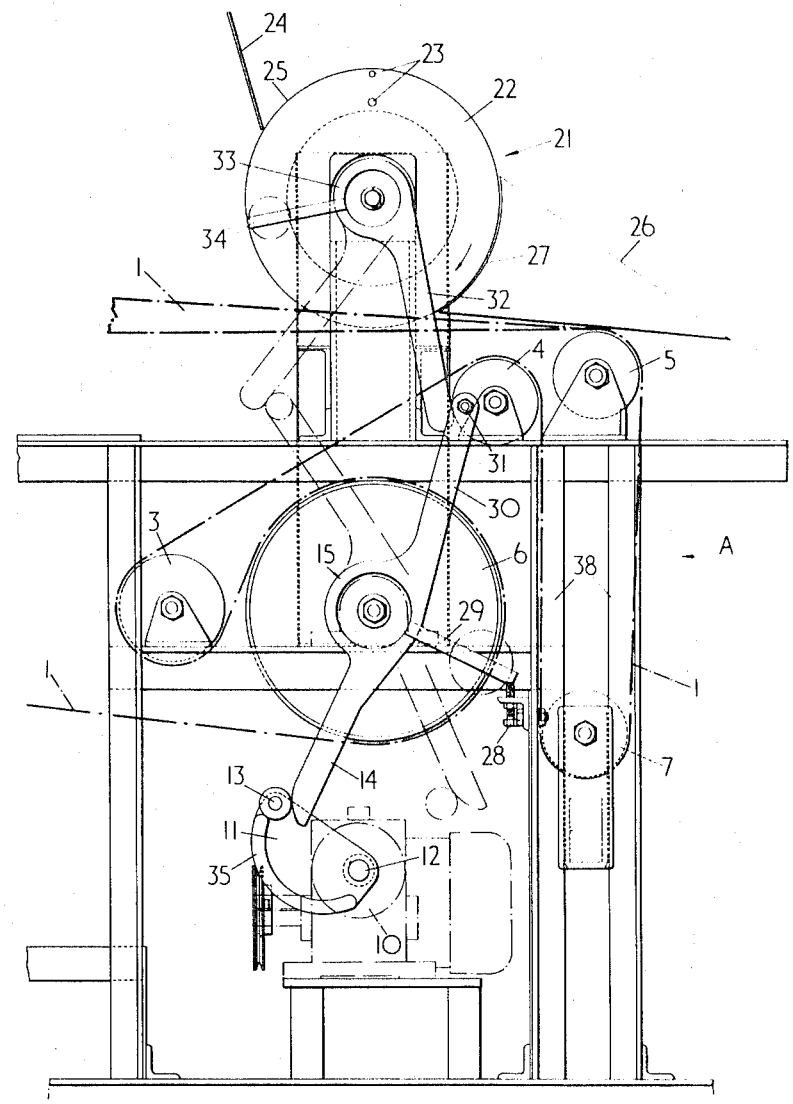
FIG. 4 is a side elevation of an alternative arrangement of part of the apparatus of FIGS. 1–3 to a larger scale and FIG. 5 is an end elevation in the direction of arrow A in FIG. 4.
Figure 5:
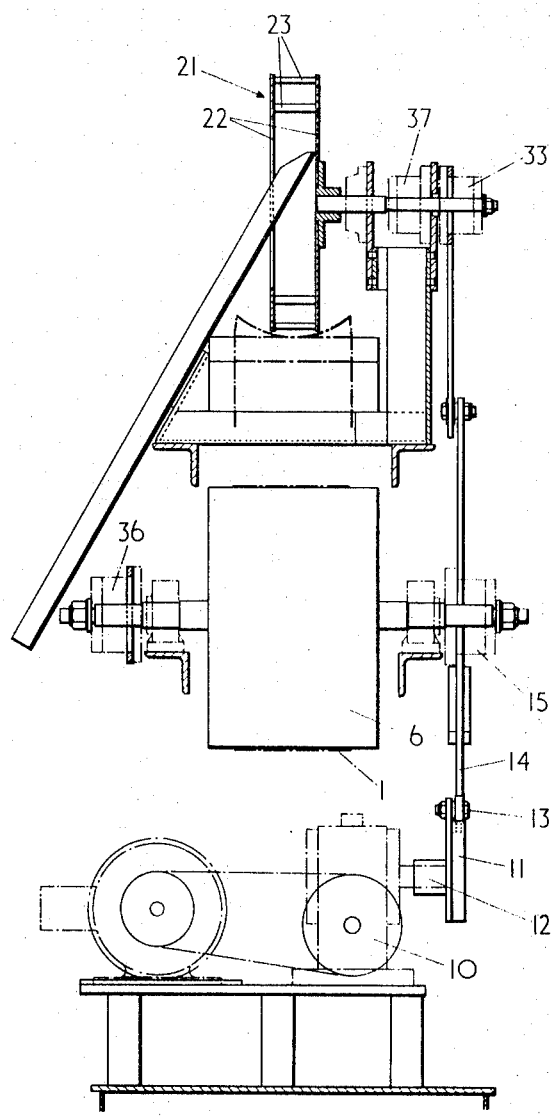

Referring now to FIGS. 4 and 5, similar parts of this alternative arrangement are given the same reference numerals as in the arrangement shown in FIGS. 1-3.

The arrangement of FIGS. 4 and 5 is suitable for use in determining the moisture content of solid bodies of a substance such as, for example, carbonaceous briquettes or ovoids.

The apparatus is basically the same as in the arrangement shown in FIGS. 1-3 with the exception of the feed means. It is desireable that with solid bodies the bodies should be fed onto the conveyor belt 1 spacially separated from one another in the direction of movement of the conveyor belt.

The feed means comprises a wheel 21 rotatable in a clockwise direction as shown in FIG. 4 and having disc 22 separated horizontally and joined by an arrangement of rollers 23. The rollers 23 are arranged to form pockets 25 so that the solid bodies rest on and are supported by the rollers as the wheel 21 rotates. The bodies are fed onto the upper part of the wheel 21 along a feed chute 24, in excess of the number of bodies which can be accommodated in the pockets 25, so that it is ensured that all the pockets are occupied by the bodies. As the wheel 21 is rotated the excess bodies are removed from the wheel 21 and pass along an overspill chute 26. The bodies in the pockets 25 are prevented from leaving the wheel 21 until the bodies are directly over the conveyor belt 1 passing under the wheel 21, by a curved plate 27.

The wheel 21 is coupled to the drive means of the drive pulley 6 so that the wheel 21 rotates only as the conveyor belt 1 is moved and the bodies are deposited on the belt while moving at the same speed as the conveyor belt, thereby preventing abrasion of the belt by the bodies and maintaining the desired spacing of the bodies.

The drive means of the drive pulley 6 is shown in more detail than in FIGS. 1-3 but is similar to that described with reference to FIGS. 1-3. In FIG. 4 is shown the balance 29 which is contactable with a stop member 28 whose position is vertically adjustable by screw means to adjust the extend of angular rotation of the drive roller 6. The balance arm 29 is attached to the free wheel device 15. The arm 11 carries a further cam member 35 which delays the return movement of the arm 14 until the measuring period is almost complete, and the member 35 reduces shock caused by the balance arm striking the stop member 28.

A further arm 30 is attached to the free wheel device 15 and serves to operate the wheel 21. The arm 30 carries a cam member 31 at its outer end and the cam member 31 is adapted to engage an arm 32 extending from a free wheel device 33 located about the shaft of the wheel 21. Angular movement of the arm 30 causes the wheel 21 to rotate in increments in a similar manner to the drive roller 6, the ratchet mechanism 33 also having a balance arm 34 to return the ratchet mechanism 33 to its initial position after each movement.

The tensioning arrangement for the belt 1 can be seen in FIG. 4. The tensioning roller 7 is movable in vertical guides 38 and is weighted to provide a predetermined tension in the conveyor belt 1.

Free wheel members 36 and 37 are also provided working in opposition to free wheel device 15 and 33 to prevent reverse motion of the conveyor belt and wheel 21.

We claim:

1. Apparatus for determining the moisture content of a substance, the apparatus comprising a conveyor belt for the substance, means for feeding the substance to the belt, a nuclear magnetic resonance spectrometer having an elongated bore and an adjacent sensing element adapted to detect the presence of hydrogen nuclei present in the water of the said substance, guide means for the conveyor belt acting to shape the belt to conform to said bore and to substantially enclose the substance being carried on the portion of the belt adjacent said sensing element, drive means for advancing the belt intermittently past the sensing element means for registering the hydrogen nuclei count of the water present in the substance detected by the sensing element and means for receiving material from the belt.

2. Apparatus as claimed in claim 1, in which the substance is in a solid divided state and in which the feed means includes a drive, the drive being arranged to operate in conjunction with the conveyor drive to feed the substance intermittently to the conveyor in advance of the spectrometer, and said feed means constitutes a screw feeder adapted to operate at a rate such that when the substance is fed to the spectrometer the substance occupies substantially the whole of an area of the bore where analysis occurs.

3. Apparatus as claimed in claim 1, in which the feed means includes a drive, the drive being arranged to operate in conjunction with the conveyor drive to feed the substance intermittently to the conveyor in advance of the spectrometer, and said feed means constitutes a roller having a plurality of pockets in its periphery for speeding material in the form of solid bodies to the conveyor, each pocket being arranged to receive an equal number of bodies.

4. Apparatus as claimed in claim 1 and including scraping means for removing any substance adhering to the conveyor after the substance has been discharged from the conveyor.

5. The apparatus of claim 1 in which the elongated bore is tubular and the conveyor guide means forms the belt into a tube.